(12) United States Patent
Hansen

(10) Patent No.: US 9,476,245 B2
(45) Date of Patent: Oct. 25, 2016

(54) DOOR CABLE PULLEY SYSTEM

(71) Applicant: Strattec Power Access LLC, Troy, MI (US)

(72) Inventor: Eric R. Hansen, Lake Orion, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 0 days.

(21) Appl. No.: 14/839,415

(22) Filed: Aug. 28, 2015

(65) Prior Publication Data

US 2016/0060942 A1   Mar. 3, 2016

Related U.S. Application Data

(60) Provisional application No. 62/043,819, filed on Aug. 29, 2014.

(51) Int. Cl.
| | |
|---|---|
| *B60J 5/04* | (2006.01) |
| *E05F 15/643* | (2015.01) |
| *E05F 15/655* | (2015.01) |
| *B60J 5/06* | (2006.01) |
| *E05D 15/10* | (2006.01) |
| *E05F 15/646* | (2015.01) |

(52) U.S. Cl.
CPC ............. *E05F 15/643* (2015.01); *B60J 5/047* (2013.01); *B60J 5/06* (2013.01); *E05D 15/1042* (2013.01); *E05D 15/1047* (2013.01); *E05F 15/655* (2015.01); *E05D 2015/1026* (2013.01); *E05D 2015/1055* (2013.01); *E05F 15/646* (2015.01); *E05Y 2201/664* (2013.01); *E05Y 2201/668* (2013.01); *E05Y 2201/672* (2013.01)

(58) Field of Classification Search
CPC .................. E05Y 2900/531; E05Y 2201/654; E05Y 2201/664; E05Y 2201/668; E05Y 2201/672; E05Y 2800/21; E05Y 2600/31; E05F 15/643; E05F 15/655; B60J 5/047; B60J 5/06
USPC ............................................. 49/360; 296/155
See application file for complete search history.

(56) References Cited

U.S. PATENT DOCUMENTS

| | | |
|---|---|---|
| 4,932,715 A | 6/1990 | Kramer |
| 5,168,666 A | 12/1992 | Koura et al. |
| 5,323,570 A | 6/1994 | Kuhlman et al. |

(Continued)

FOREIGN PATENT DOCUMENTS

| | | |
|---|---|---|
| AU | 783962 | 1/2002 |
| DE | 19828393 | 1/1999 |

(Continued)

*Primary Examiner* — Justin Rephann
(74) *Attorney, Agent, or Firm* — Michael Best & Friedrich LLP

(57) ABSTRACT

A door cable pulley system for use with a motor vehicle having a closure movable between an open and closed position. The door cable pulley system includes a first tension pulley, a second tension pulley, a cable drum driven by a motor, and a pair of drive cables. The first drive cable includes a first end coupled to the cable drum and a second end coupled to the closure, where the first drive cable extends from the cable drum, passes over the first tension pulley, and exits the body through the second exit opening. The second drive cable includes a first end coupled to the cable drum and a second end coupled to the closure, where the second drive cable extends from the cable drum, passes over the second tension pulley, and exits the body through the first exit opening.

11 Claims, 5 Drawing Sheets

(56) References Cited

U.S. PATENT DOCUMENTS

| | | | |
|---|---|---|---|
| 5,737,876 A * | 4/1998 | Dowling | F16H 19/00 49/360 |
| 5,806,246 A | 9/1998 | Azuma | |
| 5,829,198 A | 11/1998 | Watanabe | |
| 5,832,669 A | 11/1998 | Mizuki et al. | |
| 5,833,301 A * | 11/1998 | Watanabe | E05F 15/646 296/155 |
| 5,884,433 A * | 3/1999 | Watanabe | F16C 1/22 49/360 |
| 6,616,091 B2 * | 9/2003 | Priest | E05F 15/646 242/602.1 |
| 6,866,250 B2 * | 3/2005 | Kita | E05F 15/646 254/225 |
| 7,032,349 B2 | 4/2006 | Oberheide et al. | |
| 7,134,241 B2 * | 11/2006 | Suzuki | E05F 15/646 296/155 |
| 7,218,069 B2 | 5/2007 | Imai et al. | |
| 7,287,805 B2 | 10/2007 | Yamada et al. | |
| 7,328,934 B2 | 2/2008 | Sato | |
| 7,341,304 B2 * | 3/2008 | Osada | B60J 5/06 296/146.1 |
| 7,556,577 B2 * | 7/2009 | Kita | E05F 15/646 296/155 |
| 7,627,990 B2 | 12/2009 | Yokomori et al. | |
| 7,690,156 B2 | 4/2010 | Imai et al. | |
| 7,866,731 B2 | 1/2011 | Oberheide et al. | |
| 7,930,855 B2 | 4/2011 | Yoshida et al. | |
| 7,997,639 B2 | 8/2011 | Yokomori et al. | |
| 8,127,497 B2 | 3/2012 | Rogers et al. | |
| 8,256,161 B2 | 9/2012 | Nagai et al. | |
| 8,322,074 B2 * | 12/2012 | Kita | E05F 15/646 192/84.961 |
| 8,336,259 B2 | 12/2012 | Ishida et al. | |
| 8,800,205 B2 | 8/2014 | Yamaguchi et al. | |
| 2002/0112404 A1 | 8/2002 | Au Truong | |
| 2004/0195419 A1 * | 10/2004 | Yamagishi | E05F 15/646 242/365.6 |
| 2004/0216383 A1 * | 11/2004 | Rogers, Jr. | E05B 85/26 49/360 |
| 2004/0221511 A1 * | 11/2004 | Rogers, Jr. | E05F 15/643 49/360 |
| 2005/0055883 A1 * | 3/2005 | Sato | E05F 15/646 49/360 |
| 2005/0253414 A1 * | 11/2005 | Yokomori | B60J 5/06 296/146.4 |
| 2006/0032142 A1 * | 2/2006 | Yokomori | E05F 15/646 49/324 |
| 2006/0112643 A1 * | 6/2006 | Yokomori | E05F 15/646 49/360 |
| 2006/0225358 A1 | 10/2006 | Haag et al. | |
| 2006/0284447 A1 * | 12/2006 | Sato | E05F 15/646 296/155 |
| 2007/0163179 A1 * | 7/2007 | Fukumura | E05F 15/646 49/360 |
| 2008/0000161 A1 * | 1/2008 | Nagai | E05F 15/646 49/360 |
| 2008/0036317 A1 * | 2/2008 | Miyagawa | H02K 7/1004 310/83 |
| 2008/0178528 A1 * | 7/2008 | Yoshida | E05F 15/646 49/332 |
| 2008/0178529 A1 * | 7/2008 | Yoshida | E05F 15/646 49/352 |
| 2008/0179919 A1 * | 7/2008 | Yoshida | E05F 15/646 296/202 |
| 2009/0019776 A1 * | 1/2009 | Ohtaki | E05D 13/00 49/360 |
| 2009/0107048 A1 * | 4/2009 | Nagai | E05B 81/20 49/280 |
| 2009/0300989 A1 * | 12/2009 | Oberheide | E05F 15/646 49/360 |
| 2010/0043296 A1 * | 2/2010 | Oxley | C03B 37/01208 49/360 |
| 2010/0170159 A1 * | 7/2010 | Takeuchi | B60J 5/06 49/360 |
| 2010/0180508 A1 * | 7/2010 | Yamaguchi | B60J 5/06 49/358 |
| 2013/0123056 A1 * | 5/2013 | Ishida | E05F 15/646 475/149 |
| 2013/0160581 A1 * | 6/2013 | Okada | E05F 15/145 74/89.2 |
| 2013/0320704 A1 * | 12/2013 | Sumiya | B60J 5/06 296/146.1 |
| 2013/0333290 A1 * | 12/2013 | Ishigaki | E05F 15/10 49/349 |
| 2015/0251525 A1 * | 9/2015 | Atomura | E05F 15/643 49/360 |

FOREIGN PATENT DOCUMENTS

| | | |
|---|---|---|
| DE | 202006003901 | 7/2007 |
| EP | 0837209 | 4/1998 |
| EP | 0837211 | 4/1998 |
| EP | 1167675 | 1/2002 |
| JP | H11122791 | 4/1999 |
| JP | 2000008709 | 1/2000 |
| JP | 2001012147 | 1/2001 |
| JP | 2002038816 | 2/2002 |
| JP | 2002303077 | 10/2002 |
| JP | 3354495 | 12/2002 |
| JP | 3721130 | 11/2005 |
| JP | 3771324 | 4/2006 |
| JP | 2006118129 | 5/2006 |
| JP | 2007217865 | 8/2007 |
| JP | 2008208641 | 9/2008 |
| JP | 2009057773 | 3/2009 |
| JP | 2009127289 | 6/2009 |
| JP | 4296136 | 7/2009 |
| JP | 2009293217 | 12/2009 |
| JP | 4491518 | 6/2010 |
| JP | 2011074579 | 4/2011 |
| JP | 2011241655 | 12/2011 |
| JP | 2011256559 | 12/2011 |
| JP | 4893144 | 3/2012 |
| SE | 518217 | 9/2002 |
| WO | 2010150744 | 12/2010 |
| WO | 2014061599 | 4/2014 |

* cited by examiner

DOOR CABLE PULLEY SYSTEM

CROSS REFERENCE TO RELATED APPLICATIONS

This application claims the benefit of and priority to U.S. Provisional Patent Application No. 62/043,819 filed Aug. 29, 2014. The entire contents of which are hereby incorporated by reference.

FIELD OF THE INVENTION

The present invention relates generally to closure manipulating system for use on a motor vehicle, and more particularly to a cable driven closure manipulating system.

BACKGROUND

During the use of a motor vehicle, each of the closures are repeatedly opened and closed to provide access to the vehicle in any number of unique circumstances. Dependent upon the circumstances surrounding a particular use, power assist may or may not be needed. Furthermore, given the ever increasing number of features being installed on vehicles, less and less space can be allocated for any one device. Still further, as specific features become more prevalent on vehicles, cost effectiveness becomes all the more paramount. In modern vehicle design, compromises must be stuck in order to best provide the features desired by the user in a way that can be economically and mechanically supported by the underlying vehicle.

SUMMARY

In one embodiment, the present invention provides a door cable pulley system for use with a motor vehicle having a closure and a closure frame, and where the closure is movable with respect to the closure frame between an open position and a closed position. The door cable pulley system includes a body defining a volume therein, and where the body also defines a first exit opening and a second exit opening opposite the first exit opening. The door cable pulley system also includes a first tension pulley positioned within the volume proximate the first exit opening, a second tension pulley positioned within the volume proximate the second exit opening, and a cable drum positioned within the volume and driven by a motor. The door cable pulley system also includes a first drive cable having a first end coupled to the cable drum and a second end coupled to the closure, where the first drive cable extends from the cable drum, passes over the first tension pulley, and exits the body through the second exit opening. The door cable pulley system also includes a second drive cable having a first end coupled to the cable drum and a second end coupled to the closure, where the second drive cable extends from the cable drum, passes over the second tension pulley, and exits the body through the first exit opening.

In another embodiment, the present invention provides a door cable pulley system for use with a motor vehicle having a closure and a closure frame, and where the closure is movable with respect to the closure frame between an open position and a closed position. The door cable pulley system includes a body defining a volume therein, a first tension pulley positioned within the volume, the first tension pulley defining a first axis of rotation, a second tension pulley positioned within the volume, the second tension pulley defining a second axis of rotation parallel to the first axis of rotation, a cable drum positioned within the volume, the cable drum defining a third axis of rotation parallel the first axis of rotation, a motor operatively coupled to the cable drum, where the motor defines a fourth axis of rotation substantially perpendicular the first axis of rotation, a first drive cable having a first end coupled to the cable drum and a second end coupled to the closure, where the first drive cable extends from the cable drum and passes over the first tension pulley before exiting the body, and a second drive cable having a first end coupled to the cable drum and a second end coupled to the closure, where the second drive cable extends from the cable drum and passes over the second tension pulley before exiting the body.

In another embodiment, the invention provides a door cable pulley system for use with a motor vehicle having a closure and a closure frame, and where the closure is movable with respect to the closure frame between an open position and a closed position. The door cable pulley system includes a body defining a volume therein, a first tension pulley positioned within the volume, a second tension pulley positioned within the volume, and a cable drum positioned within the volume. The door cable pulley system also includes a first drive cable having a first end coupled to the cable drum and a second end coupled to the closure, where the first drive cable extends from the cable drum, passes over the first tension pulley, and exits the volume. The door cable pulley system also includes a second drive cable having a first end coupled to the cable drum and a second end coupled to the closure, where the second drive cable extends from the cable drum, passes over the second tension pulley, and exits the volume. The door cable pulley system also includes a motor positioned within the volume, and a clutch selectively coupling the motor and the cable drum, the clutch being adjustable between an engaged configuration, where torque is transmitted between the motor and the cable drum, and a disengaged configuration, where torque is not transmitted between the motor and the cable drum.

In another embodiment, the present invention provides a door cable pulley system for use with a motor vehicle having a closure and a closure frame, and where the closure is movable with respect to the closure frame between an open position and a closed position. The door cable pulley system includes a drive unit mounted to the motor vehicle, a track having a first end and a second end opposite the first end, where the closure is movable along the track between the open position and the closed position, a front track pulley positioned proximate the first end of the track, a rear track pulley positioned proximate the second end of the track, a first drive cable extending from the drive unit, passing over the front track pulley, and being coupled to the closure, a second drive cable extending from the drive unit, passing over the rear track pulley, and being coupled to the closure, and a tension assembly configured to generate tension in the first and second drive cables, and where the tension assembly is positioned within the drive unit.

Figure 1:
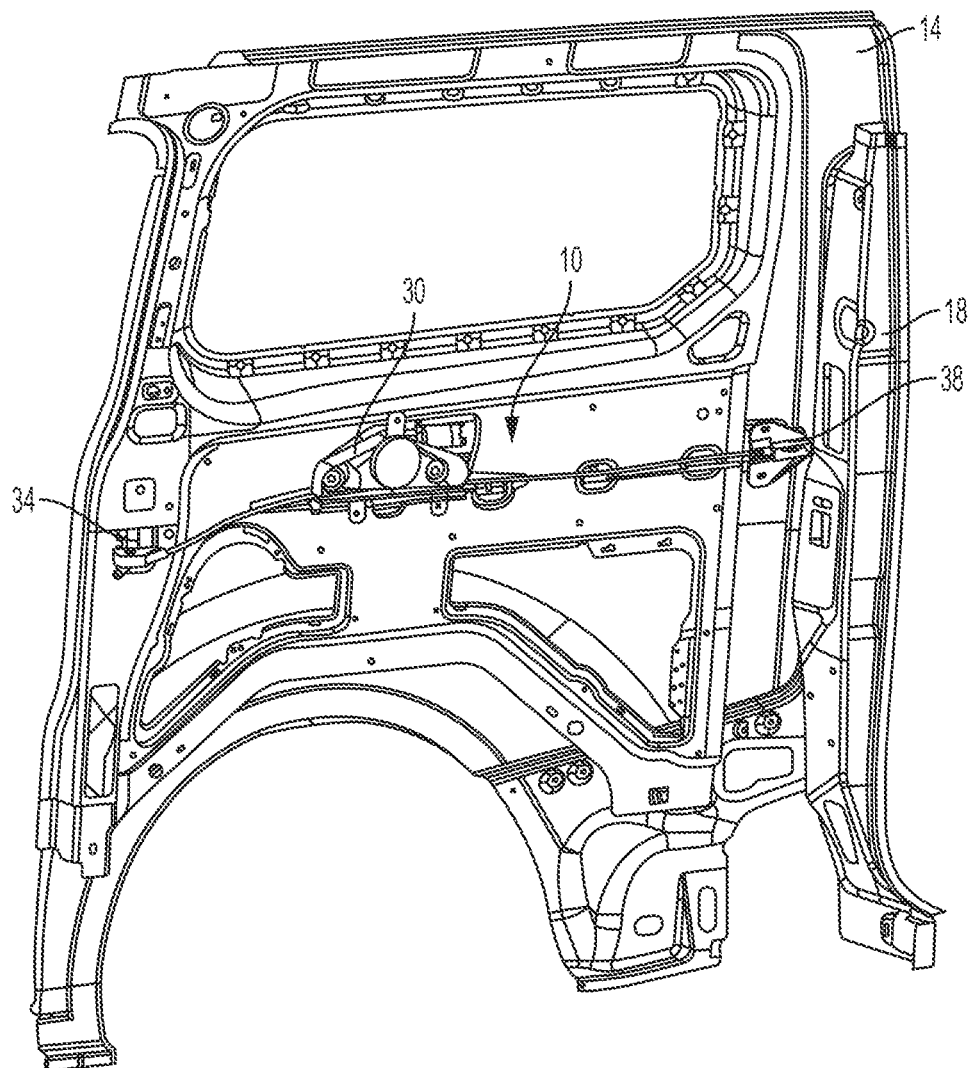
FIG. 1 is a first view of the closure manipulating system of the present invention installed on a quarter panel of a motor vehicle.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways.

DETAILED DESCRIPTION

Referring to FIGS. 1-5, exemplary embodiments of a closure manipulating system 10 are shown. In the illustrated embodiment, the system 10 is mounted within a quarter panel 14 of a motor vehicle 18, being operable to move a closure or sliding door (not shown) with respect to a closure frame (not shown) between an open position and a closed position. Specifically, the closure is mounted on a roller hinge 22 which in turn travels along a track 26 between a first position A, substantially corresponding to the closure closed position, and a second position B, substantially corresponding to the closure open position. It is to be appreciated that in alternate embodiments, the system 10 may be incorporated into additional powered door systems both linear and pivoting in nature (e.g., powered sliding doors, handicap accessible doors, actuated industrial doors, trunks, hoods, fire doors, blast doors, vault doors, and the like). In addition, the system 10 is not limited to closure type embodiments.

The system 10 of the present invention includes a drive unit 30, a front pulley housing 34, a rear pulley housing 38, the roller hinge 22, and a pair of drive cables 42, 46. During use, the drive unit 30 is operable to impart forces onto the drive cables 42, 46 which in turn move the roller hinge 22 with respect to the track 26 between the first and second positions A, B. The system 10 also includes one or more sensors (not shown) able to detect the relative position of the roller hinge 22 with respect to the track 26, and an electronic control unit (ECU; not shown) operable to send and receive signals between the sensor, the drive unit 30, and one or more user inputs (not shown). In the illustrated embodiment, the system 10 includes a Hall Effect sensor (not shown) positioned such that the sensor may track the movement of the roller hinge 22 in both an automatic and manual mode of operation (described below). Furthermore, the sensor, electronic control unit, and portions of the senor or electronic control unit can be located elsewhere on the vehicle such as integrated into the main wiring harness, on the quarter panel 14, and the like.

Figure 4:
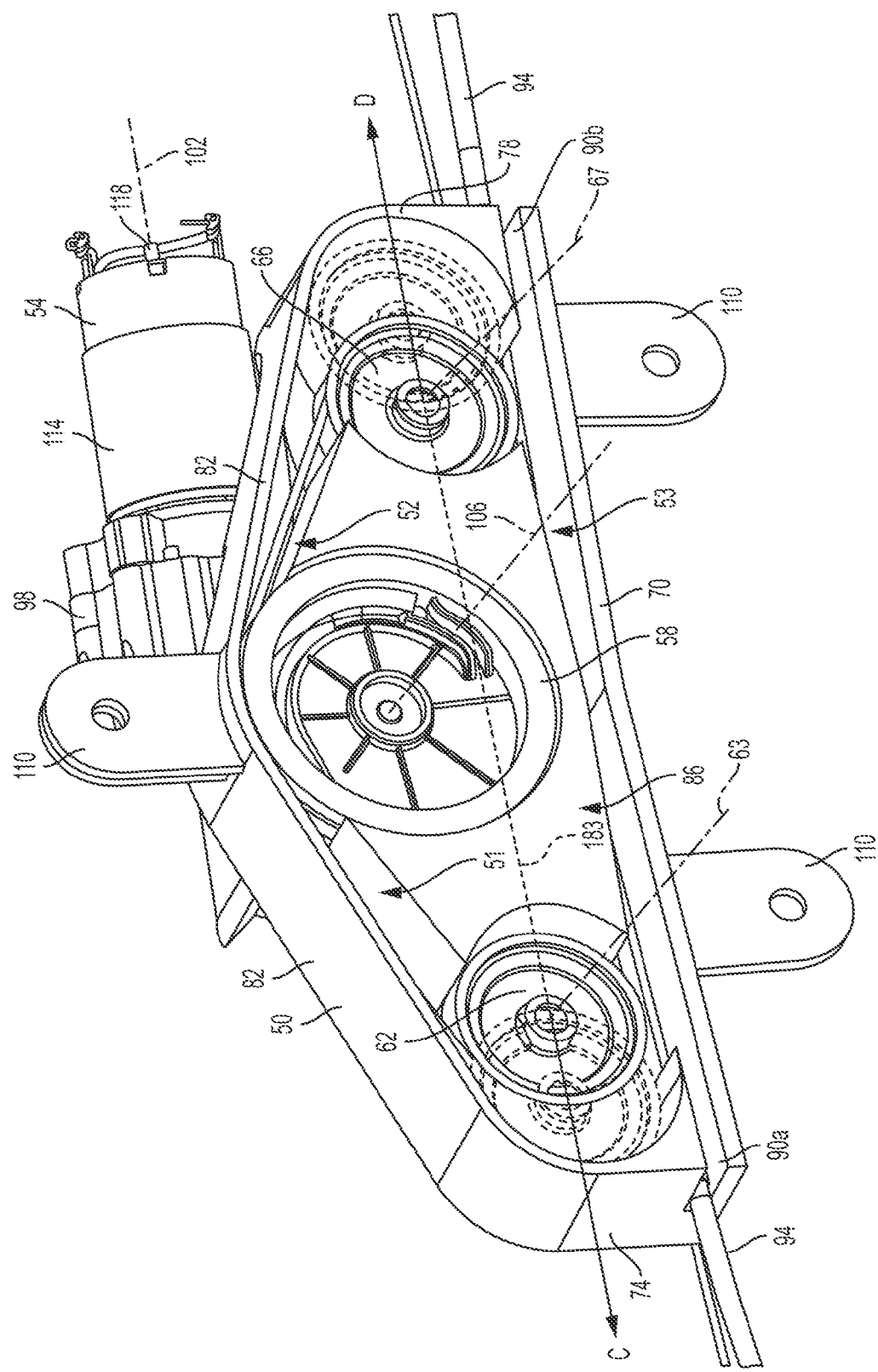
FIG. 4 is a detailed view of a drive unit of the closure manipulating system of FIG. 1.
Figure 5:
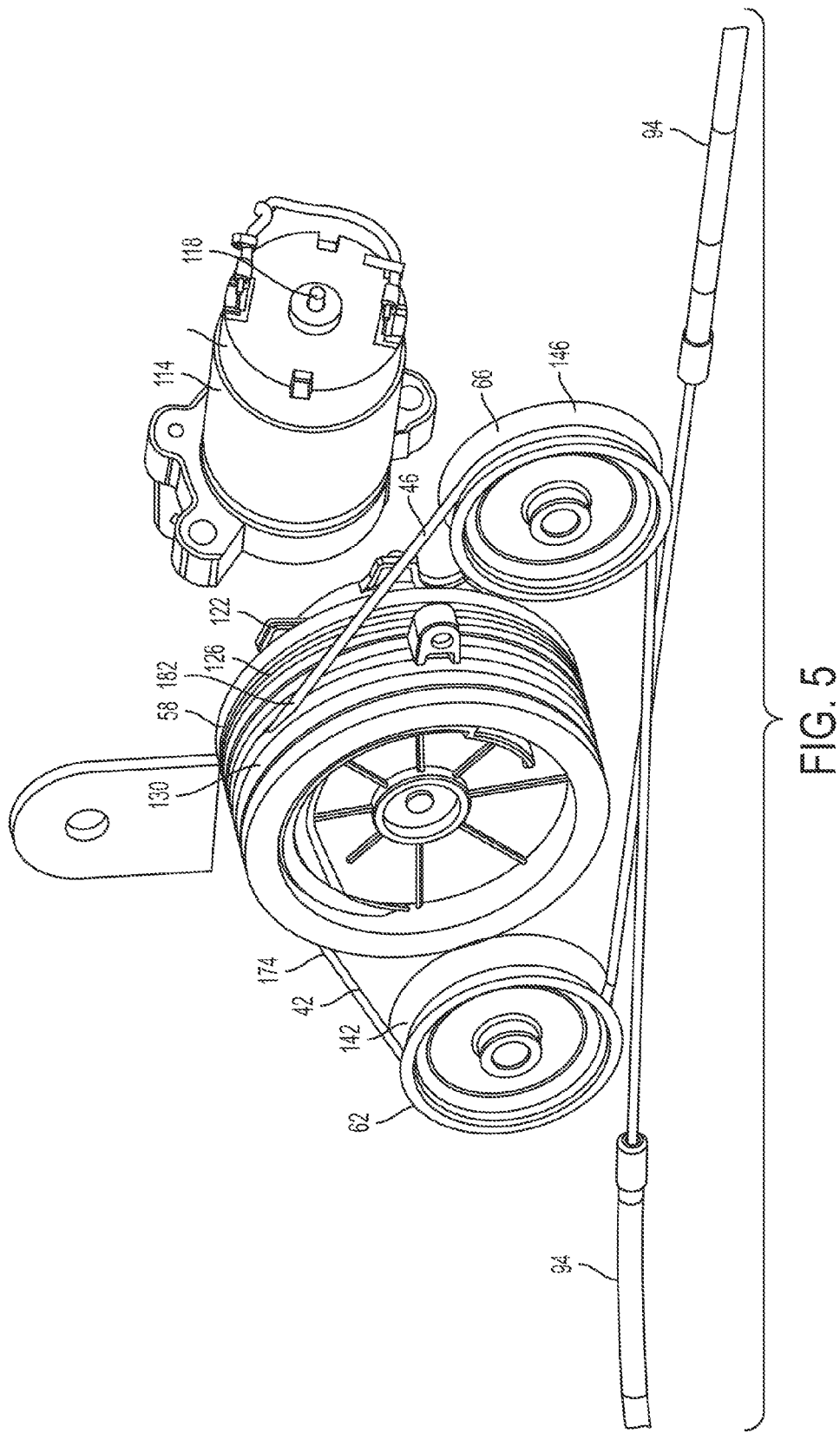
FIG. 5 illustrates the drive unit of FIG. 4 with the body removed for clarity.

Illustrated in FIGS. 4 and 5, the drive unit 30 of the closure manipulation system 10 includes a body 50, a motor 54 coupled to the body 50, a cable drum 58 driven by the motor 54, a first tension pulley 62, and a second tension pulley 66. During use, the drive unit 30 is configured to impart a driving force onto the first and second drive cables 42, 46 while also maintaining proper cable tension within the system 10. The drive unit 30 is configured such that it can maintain the tension within the system 10 without the use of idler pulleys while also minimizing the volume of space the unit 30 occupies within the vehicle 18.

The body 50 of the drive unit 30 is substantially pentagonal-prism shaped having a bottom wall 70, a pair of side walls 74, 78 extending from the ends of the bottom wall 70, and a pair of top walls 82 extending from the side walls 74, 78 at an angle to form a top or apex. The body 50 also defines a volume 86 at least partially defined by the walls 70, 74, 78, 82 and sized to receive a number of drive components (described below) therein. In the illustrated embodiment, the side walls 74, 78 at least partially define a pair of exit openings or apertures 90a, 90b, sized to receive one end of a respective cable conduit 94 therein and allow a corresponding one of the cables 42, 46 to pass therethrough.

The body 50 of the drive unit 30 also includes a motor mount 98 for coupling the motor 54 to the body 50. Specifically, the motor mount 98 is shaped such that the first axis 102 of the motor 54 is oriented substantially perpendicular to the second axis 106 of the cable drum 58 (FIG. 4). This particular orientation is desirable to maintain a relatively thin profile that minimizes the amount of space that the drive unit 30 will occupy when installed in a vehicle.

The body 50 also defines a plurality of interior channels 51, 52, 53, each of which are sized to receive one or more of the cables 42, 46 and guide them within the body 50. In the illustrated embodiment, the body 50 includes first channel 51 generally extending between the cable drum 58 and the first tension pulley 62 and configured to guide a portion of the first drive cable 42. The body 50 also includes a second channel 52 generally extending between the cable drum 58 and the second tension pulley 66 and configured to guide a portion of the second drive cable 46. The body 50 also includes a third channel 53 generally extending between the exit apertures 90a, 90b and in communication with the first and second tension pulleys 62, 66. The third channel 53 is configured to guide the first and second drive cables 42, 46 between their respective tension pulleys 62, 66 and exit apertures 90a, 90b. Although not illustrated, the third channel 53 may include a barrier member to separate the two cables 42, 46 where they cross one another.

The body 50 may also include cover (not shown) to completely enclose the volume 86 and shield any internal components from dust or other debris. In other embodiments, the body 50 may remain open on one end to provide for easier access during maintenance.

The body 50 also includes a plurality of mounting brackets 110 extending from the body 50 and configured to receive a fastener (not shown) therethrough. When assembled, the mounting brackets 110 provide mounting points for securing the body 50 of the drive unit 30 to the vehicle 18.

Illustrated in FIGS. 1-5, the motor 54 of the drive unit 30 includes a housing 114 and a drive shaft 118 rotatable with respect to the housing 114 about the first axis 102. During use, the motor 54 is mounted to the body 50 such that rotation of the drive shaft 118 causes the cable drum 58 to rotate about the second axis 106. Although not shown, the motor 54 may be operatively coupled to the cable drum 58 via a drive train, which in turn can include any number of gears, belts, pulleys, and the like. In the illustrated embodiment, the motor 54 includes a planetary gear set (not shown) to transmit the motor's torque to the clutch 122 and ultimately the cable drum 58.

The motor 54 may also include a clutch 122 positioned between the motor 54 and the cable drum 58 and adjustable between an engaged configuration, wherein the motor 54 is in driving engagement with the cable drum 58 and torque is transmitted therebetween, and a disengaged configuration, wherein the motor 54 and the cable drum 58 are mechanically isolated from one another and no torque is transmitted therebetween. During use, the clutch 122 may be placed in the disengaged configuration so as to allow the cable drum 58 to free-wheel (such as in a manual mode) without the added resistance provided by the motor 54. In the illustrated embodiment, the clutch 122 is an electromagnetic clutch and the clutch rests in the disengaged configuration. As such, the cable drum 58 is permitted to free-wheel unless the clutch 122 is adjusted to the engaged configuration; such as by a signal from the ECU and the like.

Illustrated in FIGS. 4-5, the cable drum 58 of the drive unit 30 is substantially cylindrical in shape having a first cable groove 126 and a second cable groove 130 formed therein. During use, the cable drum 58 is driven by the motor 54 about the second axis 106 in either a first direction 134, wherein the first cable 42 is at least partially wound onto the cable drum 58 in the first cable groove 126 and the second cable 48 is at least partially unwound from the second cable groove 130 of the cable drum 58; or a second direction 138, wherein the first cable 42 is at least partially unwound from the first cable groove 126 of the cable drum 58 and the second cable 48 is at least partially wound onto the cable drum 58 in the second cable groove 130. In the illustrated embodiment, the first cable groove 126 and the second cable groove 130 are configured such that, as the cable drum 58 rotates about the second axis 106, the length of cable being unwound from the drum 58 is substantially equal to the amount of cable being wound onto the drum 58.

Illustrated in FIGS. 4-5, the first tension pulley 62 is substantially disk shaped having a channel 142 formed therein that is sized to receive at least a portion of the first drive cable 42. When assembled, the first tension pulley 62 is rotatably coupled to the body 50 proximate the left side wall 74 and the exit aperture 90*a* by one or more biasing members or springs (not shown) creating an axis of rotation 63 that is substantially parallel the axis of rotation 106 of the cable drum 58. The biasing members are configured to bias the tension pulley 62 in a direction C, generally away from the center of the body 50 of the drive unit 30 and toward the left side wall 74 and exit aperture 90*a*.

Illustrated in FIGS. 4-5, the second tension pulley 66 is substantially similar to the first tension pulley 62 being substantially disk shaped and having a channel 146 formed therein that is sized to receive at least a portion of the second drive cable 46. When assembled, the second tension pulley 66 is rotatably coupled to the body 50 proximate the right side wall 78 and the exit aperture 90*b* by one or more biasing members or springs (not shown) creating an axis of rotation 67 that is substantially parallel the axis of rotation 106 of the cable drum 58. The biasing members are configured to bias the tension pulley 66 in a direction D, generally away from the center of the body 50 of the drive unit 30 and toward the right side wall 78 and the exit aperture 90*b*.

Figure 2:
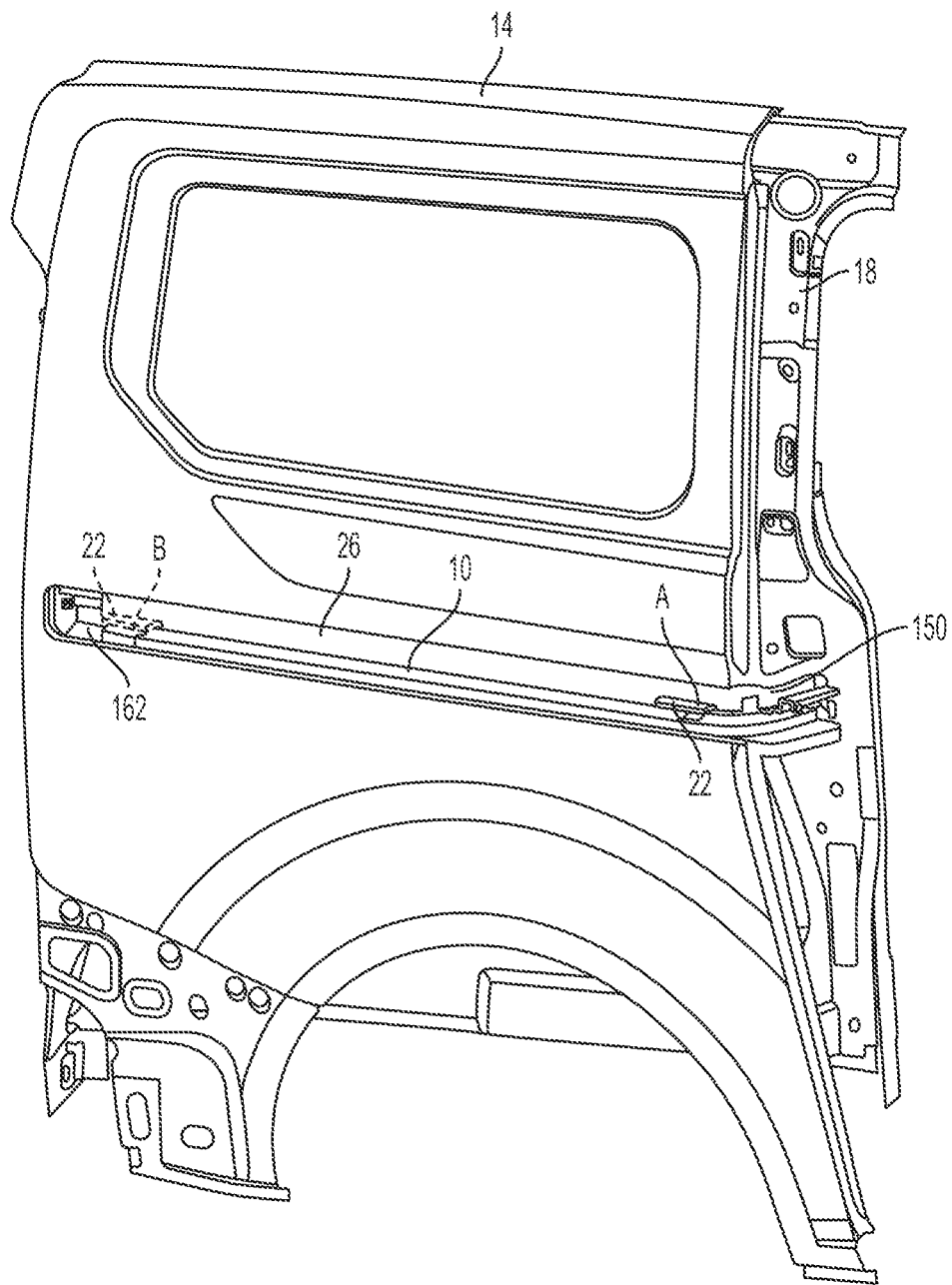
FIG. 2. is a second view of the closure manipulating system of FIG. 1 installed on the quarter panel of the motor vehicle.
Figure 3:
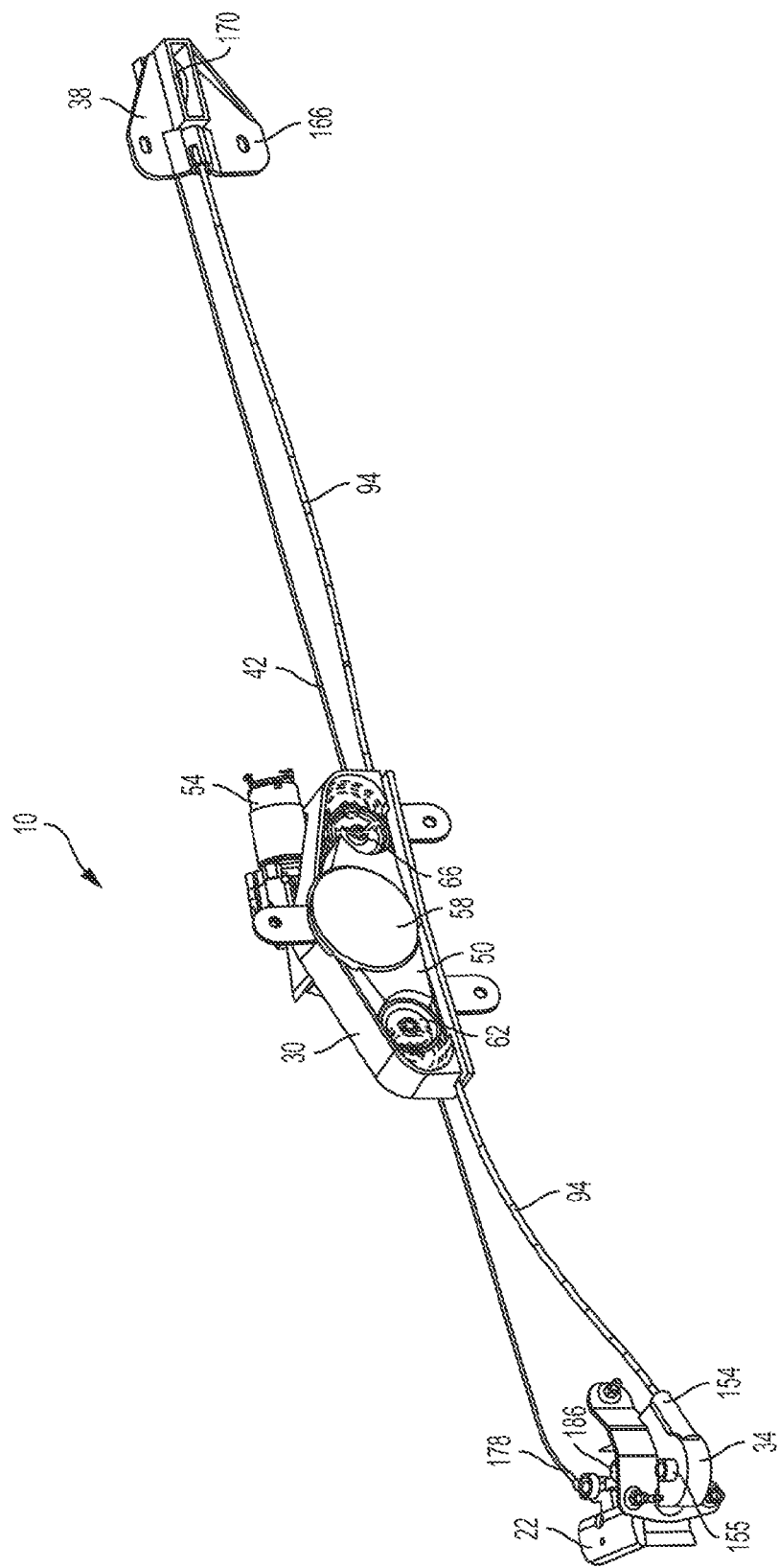
FIG. 3 illustrates the closure manipulating system of FIG. 1.

Illustrated in FIGS. 1-3, the front pulley housing 34 is positioned proximate the front of the quarter panel 14 and is configured to direct the second cable 46 into the front end 150 of the track 26. The front pulley housing 34 includes a frame 154 fixedly coupled to the quarter panel 14 and a front track pulley 155 rotatably coupled to the frame 154. During use, at least a portion of the second cable 46 passes over the pulley 155.

Illustrated in FIGS. 1-3, the rear pulley housing 38 is positioned proximate the rear of the quarter panel 14 and is configured to direct the first cable 42 into the rear end 162 of the track 26. The rear pulley housing 38 includes a frame 166 fixedly coupled to the quarter panel 14 and a rear track pulley 170 rotatably coupled to the frame 166. During use, at least a portion of the first cable 42 passes over the pulley 170.

Illustrated in FIG. 1-5, the first drive cable 42 of the system 10 is an elongated cable having a first end 174 and a second end 178 opposite the first end 174. In the illustrated embodiment, the first drive cable 42 is steel wire rope, however in alternative embodiments, other forms of cables or ropes may be used. When assembled, the first end 174 of the first drive cable 42 is fixedly coupled to the cable drum 58 and the second end 178 is coupled to the roller hinge 22 which in turn moves the closure. Specifically, the cable 42 extends around the cable drum 58 in the first cable groove 126, passes over the first tension pulley 62, extends through the first exit aperture 90*a*, passes over the rear track pulley 170 of the rear pulley housing 38 and into the rear end 162 of the track 26 where the second end 178 is coupled to the roller hinge 22. During use, winding the first drive cable 42 onto the drum 58 causes the cable 42 to pull the roller hinge 22 toward the rear end 162 of the track 26 and toward the second position B.

Illustrated in FIGS. 1-5, the second drive cable 46 of the system 10 is substantially similar to the first drive cable 42 in that it is an elongated cable having a first end 182, and a second end 186 opposite the first end 182. In the illustrated embodiment, the second drive cable 46 is formed from steel wire rope, however in alternative embodiments, other forms of known cables or ropes may be used. When assembled, the first end 182 of the second drive cable 46 is fixedly coupled to the cable drum 58 and the second end 186 is coupled to the roller hinge 22 which in turn moves the closure. Specifically, the cable 46 extends around the cable drum 58 in the second cable groove 130, passes over the second tension pulley 66, extends through the second exit aperture 90*b*, passes over the front track pulley 155 of the front pulley housing 34 and into the front end 150 of the track 26 where the second end 186 is coupled to the roller hinge 22. During use, winding the second drive cable 46 onto the drum 58 causes the cable 46 to pull the roller hinge 22 toward the front end 150 of the track 26 and toward the first position A.

When assembled, the relative location of the cable drum 58, the first tension pulley 62, the second tension pulley 66, and the drive cables 42, 46 form a general "cross-over" layout within the body 50 with each cable 42, 46 originating near the top and center of the body 50, passing over its respective tension pulley 62, 66, and then exiting the body 50 opposite from the respective tension pulley 62, 66 through a respective exit aperture 90*a*, 90*b*. In the illustrated embodiment, a reference line 183 extending between the axis 63 of the first tension pulley 62 and the axis 67 of the second tension pulley 66 will pass through the outer diameter of the cable drum 58. The general orientation between the first tension pulley 62, the second tension pulley 66, and the cable drum 58 permit the biasing members associated with each tension pulley 62, 66 to provide the necessary cable tension for the system 10 without the need for additional idler pulleys or other drive components; thereby making the system cheaper to manufacture and less prone to failures. Furthermore, the layout minimizes the height of the system 10 and reduces the amount of space the system 10 occupies within the vehicle.

The closure manipulating system 10 is operable in both an automatic mode and a manual mode. To open the closure from a closed position (e.g., the roller hinge 22 is in the first position A) in the automatic mode, the user provides a user input, such as pressing a button or pulling on the door handle (not shown). The user input is then received by the ECU, which processes the command and passes the necessary information on to the motor 54 and the clutch 122.

Upon receiving the ECU's command, the clutch 122 adjusts from the resting, unengaged configuration to the activated, engaged configuration where torque is transmitted between the motor 54 and the cable drum 58. Furthermore, the motor 54 begins rotating which in turn causes the cable drum 58 to rotate in the first direction 134. The rotation of the drum 58 causes the first cable 42 to be wound onto the drum 58 while the second cable 46 is unwound from the drum 58. As described above, winding the first cable 42 onto the drum 58 causes the roller hinge 22 to move toward the second position B and away from position A. As the roller hinge 22 moves along the track 26, the closure in turn begins to open.

Once the roller hinge 22 has reached its second position B, the sensor detects the position and, through the ECU, instructs the motor 54 to stop rotating. Furthermore, the ECU causes the clutch 122 to return to the resting, unengaged configuration. The closure is now in the open position.

To close the closure from the open position, the user provides an input, such as by pressing a button or pulling on the door handle. The user input is then received by the ECU, which processes the command and passes the necessary information on to the motor 54 and the clutch 122.

Upon receiving the ECU's command, the clutch 122 adjusts from the resting, unengaged configuration to the activated, engaged configuration where torque is transmitted between the motor 54 and the cable drum 58. Furthermore, the motor 54 begins rotating which in turn causes the cable drum 58 to rotate in the second direction 138. As such, the rotation of the drum 58 causes the first cable 42 to be unwound from the drum 58 while the second cable 46 is wound onto the drum 58. As described above, winding the second cable 46 onto the drum 58 causes the roller hinge 22 to move toward the first position A and away from position B. As the roller hinge 22 moves along the track 26, the closure in turn begins to close.

Once the roller hinge 22 has reached its first position A, the sensor detects the position and, through the ECU, instructs the motor 54 to stop rotating. Furthermore, the ECU causes the clutch 122 to return to the resting, unengaged configuration. The closure is now in the closed position.

To operate the closure manipulating system 10 in the manual mode, the user may provide an initial input by pulling on the handle of the door, causing it to unlatch from the closure frame. Since the clutch 122 is naturally in its rested, unengaged configuration, no torque is transmitted between the motor 54 and the cable drum 58. As such, the user may manually move the closure between the open and closed positions without the added resistance of back driving the motor 54.

In alternative embodiments, the user may provide a user input which is received by the ECU. The ECU processes the command and sends the proper signal to the clutch 122, which in turn changes from the engaged configuration to the disengaged configuration. With the clutch 122 in the disengaged configuration, the user is free to open and close the closure without the added resistance of the motor 54 as described above.

The invention claimed is:

1. A door cable pulley system for use with a motor vehicle having a closure and a closure frame, and wherein the closure is movable with respect to the closure frame between an open position and a closed position, the door cable pulley system comprising:
   a body defining a volume therein, and wherein the body also defines a first exit opening and a second exit opening opposite the first exit opening;
   a first tension pulley defining a first axis of rotation, wherein the first tension pulley is positioned within the volume proximate the first exit opening, and wherein the first axis is movable with respect to the body;
   a second tension pulley defining a second axis of rotation, wherein the second pulley is positioned within the volume proximate the second exit opening, and wherein the second axis is movable with respect to the body;
   a cable drum positioned within the volume and driven by a motor;
   a first drive cable having a first end coupled to the cable drum and a second end coupled to the closure, wherein the first drive cable extends from the cable drum, passes over the first tension pulley, and exits the body through the second exit opening; and
   a second drive cable having a first end coupled to the cable drum and a second end coupled to the closure, wherein the second drive cable extends from the cable drum, passes over the second tension pulley, and exits the body through the first exit opening.

2. The door cable pulley system of claim 1, wherein the first tension pulley is biased toward the first exit opening to generate tension in the first drive cable.

3. The door cable pulley system of claim 2, wherein the second tension pulley is biased toward the second exit opening to generate tension in the second drive cable.

4. The door cable pulley system of claim 2, wherein the first tension pulley is biased toward the first exit opening by a spring.

5. The door cable pulley system of claim 1, further comprising a track, a front track pulley positioned outside the volume, and a rear track pulley positioned outside the volume, and wherein the closure moves between the open and closed positions along the track.

6. The door cable pulley system of claim 5, wherein the front track pulley and the rear track pulley are fixed with respect to the closure opening of the motor vehicle.

7. The door cable pulley system of claim 1, further comprising a clutch selectively coupling the motor to the cable drum.

8. The door cable pulley system of claim 7, wherein the clutch is adjustable between an engaged configuration, wherein torque is transmitted between the cable drum and the motor, and a disengaged configuration, wherein torque is not transmitted between the cable drum and the motor.

9. The door cable pulley system of claim 1, wherein the first drive cable exits the body in a first direction, and wherein the second drive cable exits the body in a second direction, and wherein the first direction is substantially parallel the second direction.

10. A door cable pulley system for use with a motor vehicle having a closure and a closure frame, and wherein the closure is movable with respect to the closure frame between an open position and a closed position, the door cable pulley system comprising:
   a body defining a volume therein, and wherein the body also defines a first exit opening and a second exit opening opposite the first exit opening;
   a first tension pulley positioned within the volume proximate the first exit opening;
   a second tension pulley positioned within the volume proximate the second exit opening;
   a cable drum positioned within the volume and driven by a motor;
   a first drive cable having a first end coupled to the cable drum and a second end coupled to the closure, wherein the first drive cable extends from the cable drum, passes over the first tension pulley, and exits the body through the second exit opening;

a second drive cable having a first end coupled to the cable drum and a second end coupled to the closure, wherein the second drive cable extends from the cable drum, passes over the second tension pulley, and exits the body through the first exit opening;

wherein the first tension pulley is biased toward the first exit opening to generate tension in the first drive cable;

wherein the second tension pulley is biased toward the second exit opening to generate tension in the second drive cable; and wherein the second tension pulley is biased independently of the first tension pulley.

11. A door cable pulley system for use with a motor vehicle having a closure and a closure frame, and wherein the closure is movable with respect to the closure frame between an open position and a closed position, the door cable pulley system comprising:

a body defining a volume therein, and wherein the body also defines a first exit opening and a second exit opening opposite the first exit opening;

a first tension pulley positioned within the volume proximate the first exit opening;

a second tension pulley positioned within the volume proximate the second exit opening;

a cable drum positioned within the volume and driven by a motor;

a first drive cable having a first end coupled to the cable drum and a second end coupled to the closure, wherein the first drive cable extends from the cable drum, passes over the first tension pulley, and exits the body through the second exit opening;

a second drive cable having a first end coupled to the cable drum and a second end coupled to the closure, wherein the second drive cable extends from the cable drum, passes over the second tension pulley, and exits the body through the first exit opening; and wherein an axis extending between the first and second drive pulleys passes through the outer diameter of the cable drum.

* * * * *